US012636942B2

(12) United States Patent
Becker

(10) Patent No.: US 12,636,942 B2
(45) Date of Patent: May 26, 2026

(54) TONNEAU COVER SYSTEM AND LOCK ASSEMBLY FOR A TONNEAU COVER SYSTEM

(71) Applicant: Extang Corporation, Ann Arbor, MI (US)

(72) Inventor: Anthony Becker, Saline, MI (US)

(73) Assignee: Extang Corporation, Ann Arbor, MI (US)

( * ) Notice: Subject to any disclaimer, the term of this patent is extended or adjusted under 35 U.S.C. 154(b) by 373 days.

(21) Appl. No.: 18/232,883

(22) Filed: Aug. 11, 2023

(65) Prior Publication Data

US 2025/0050715 A1     Feb. 13, 2025

(51) Int. Cl.
B60J 7/19          (2006.01)
B60J 7/04          (2006.01)

(52) U.S. Cl.
CPC ............... B60J 7/198 (2013.01); B60J 7/041 (2013.01)

(58) Field of Classification Search
CPC ............ B60J 7/041; B60J 7/198; B60J 7/068
USPC ................................................... 296/100.04
See application file for complete search history.

(56) References Cited

U.S. PATENT DOCUMENTS

| | | | | |
|---|---|---|---|---|
| 4,015,454 A | * | 4/1977 | Struble | ................... E05C 9/048 70/2 |
| 4,611,848 A | | 9/1986 | Romano | |

| | | | | |
|---|---|---|---|---|
| 5,350,213 A | * | 9/1994 | Bernardo | ................. B60J 7/041 296/100.09 |
| 6,276,735 B1 | * | 8/2001 | Champion | .............. B60R 11/06 296/100.1 |
| 6,354,650 B2 | * | 3/2002 | Terhaar | ................... E05C 9/048 49/394 |
| 6,913,297 B2 | * | 7/2005 | Jackson | ................ E05B 1/0092 292/DIG. 31 |
| 7,258,387 B2 | * | 8/2007 | Weldy | ...................... B60J 7/198 296/100.07 |
| 8,857,230 B1 | | 10/2014 | Misner | |
| 9,296,285 B2 | | 3/2016 | Copp et al. | |
| 9,834,076 B2 | | 12/2017 | Rohr et al. | |
| 10,112,464 B2 | * | 10/2018 | Koengeter | ................ B60P 7/02 |
| 10,286,765 B2 | * | 5/2019 | Williamson | .............. B60P 7/00 |
| 10,414,256 B2 | * | 9/2019 | Frederick | ................. B60J 7/141 |
| 10,688,852 B2 | | 6/2020 | Fargo et al. | |
| 10,737,563 B2 | | 8/2020 | Carter et al. | |

(Continued)

OTHER PUBLICATIONS

International Search Report and Written Opinion dated Jun. 12, 2024, for International Application PCT/US2024/015111.

(Continued)

*Primary Examiner* — Jason S Morrow

(57)                    ABSTRACT

A tonneau cover system for covering a cargo area of a vehicle, the tonneau cover system including: a side rail configured to attach to a side wall of the cargo area of the vehicle, the side rail comprising a bottom wall; a cover comprising a plurality of slats, the plurality of slats comprising a tail slat connected to a slat, the tail slat comprising one or more rollers that are supported on a top surface of the bottom wall of the side rail; a lock assembly connected to the tail slat, the lock assembly comprising a first locking device connected to the tail slat, the first locking device comprising a first locking member that is configured to engage a bottom surface of the bottom wall of the side rail to lock or restrict movement of the cover relative to the side rail.

14 Claims, 9 Drawing Sheets

(56)  References Cited

U.S. PATENT DOCUMENTS

| | | | | |
|---|---|---|---|---|
| 10,759,260 B2 * | 9/2020 | Spencer | .................... | B60P 7/02 |
| 10,759,261 B2 * | 9/2020 | Spencer | .................... | B60P 7/02 |
| 11,007,855 B2 | 5/2021 | Rawnsley et al. | | |
| 11,097,605 B2 * | 8/2021 | Mahler | ................ | B62D 33/046 |
| 12,246,779 B2 * | 3/2025 | Spray | ........................ | B60J 7/068 |
| 2005/0146158 A1 * | 7/2005 | Schmeichel | ............. | B60J 7/102 |
| | | | | 296/100.16 |
| 2007/0063529 A1 * | 3/2007 | Weldy | ......................... | B60J 7/08 |
| | | | | 296/100.07 |
| 2016/0236552 A1 | 8/2016 | Hannan et al. | | |
| 2018/0118002 A1 | 5/2018 | Koengeter et al. | | |
| 2019/0009657 A1 | 1/2019 | Carter et al. | | |
| 2020/0180414 A1 * | 6/2020 | Spencer | .................. | B60J 7/085 |
| 2021/0094396 A1 * | 4/2021 | Schollhammer | ......... | B60J 7/068 |
| 2021/0114444 A1 | 4/2021 | Voegele | | |
| 2022/0396997 A1 * | 12/2022 | Zarbeck | .................... | E06B 9/15 |
| 2023/0331074 A1 * | 10/2023 | Schmeichel | ............. | B60J 7/198 |

OTHER PUBLICATIONS

International Preliminary Report on Patentability of the International Searching Authority, PCT/US2024/015111, dated Feb. 26, 2026.

* cited by examiner

TONNEAU COVER SYSTEM AND LOCK ASSEMBLY FOR A TONNEAU COVER SYSTEM

CROSS REFERENCE TO RELATED APPLICATIONS

None

FIELD

These teachings relate to a cover assembly for a vehicle cargo area, and more particularly to a tonneau cover system and a lock assembly for a tonneau cover system.

BACKGROUND

Some vehicles, like pick-up trucks, have an open-top bed or cargo area that may be used for storing or transporting cargo. A cover, such as a tonneau cover, may be placed over the cargo area. The tonneau cover may be opened to provide access to the cargo and/or the inside of the cargo area and closed to conceal the cargo from view and/or to prevent fluid and/or debris from entering the cargo area. The tonneau cover may be part of a tonneau cover system that includes a pair of opposing side rails attached to a pair of opposing side walls defining the cargo area of the vehicle. Some tonneau cover systems are known to have a lock assembly for restricting or preventing opening and/or closing of the tonneau cover.

It may be desirable to improve the current state of the art.

SUMMARY

These teachings provide a tonneau cover system and a lock assembly for a tonneau cover system. A tonneau cover system for covering a cargo area of a vehicle, the tonneau cover system including: a side rail configured to attach to a side wall of the cargo area of the vehicle, the side rail comprising a bottom wall; a cover comprising a plurality of slats, the plurality of slats comprising a tail slat connected to a slat, the tail slat comprising one or more rollers that are supported on a top surface of the bottom wall of the side rail; a lock assembly connected to the tail slat, the lock assembly comprising a first locking device connected to the tail slat, the first locking device comprising a first locking member that is configured to engage a bottom surface of the bottom wall of the side rail to lock or restrict movement of the cover relative to the side rail.

DETAILED DESCRIPTION

Figure 1:
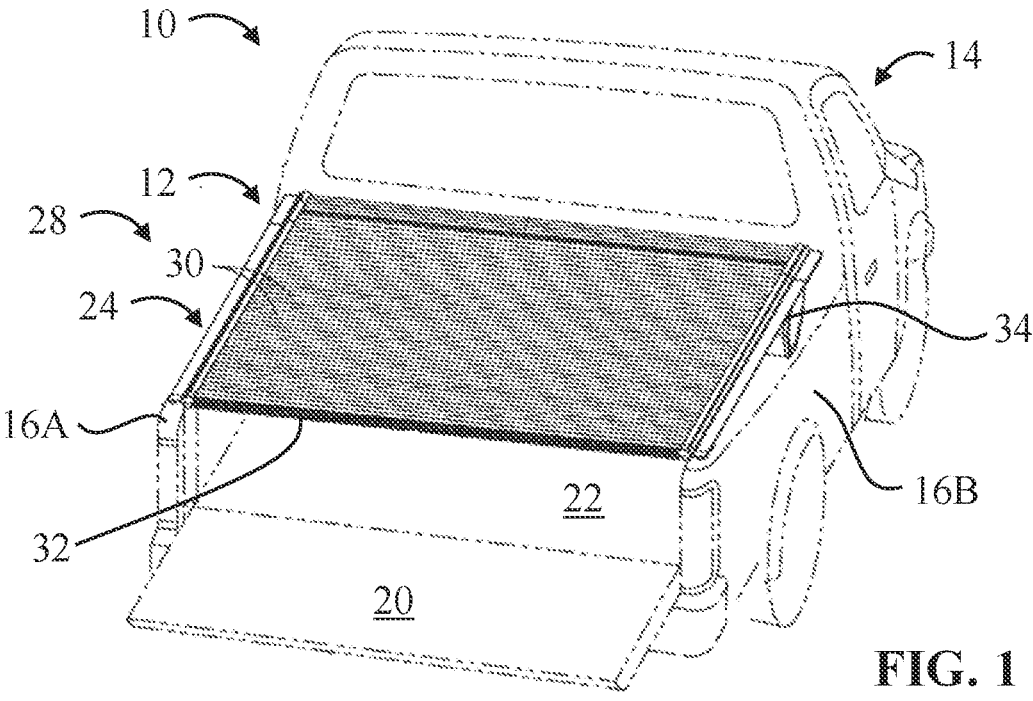
FIG. 1 is a perspective view of a tonneau cover system installed on a vehicle; the tonneau cover is in a closed configuration.
Figure 2:
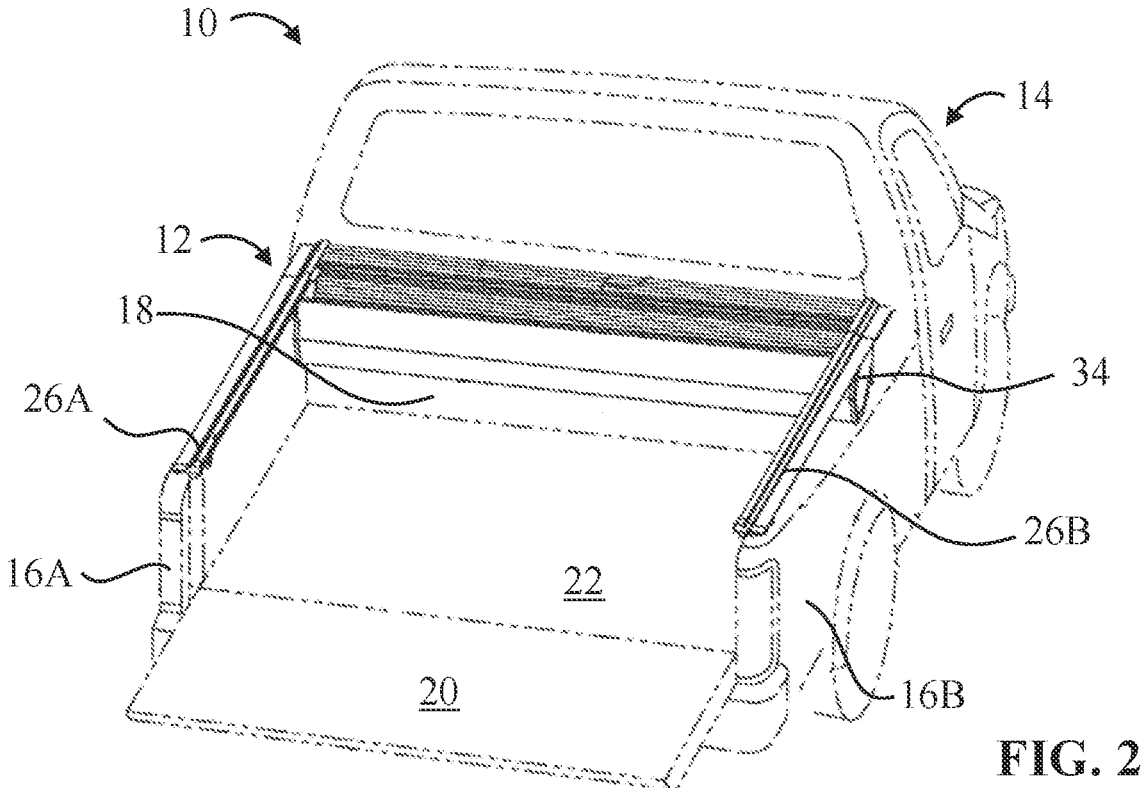
FIG. 2 is a perspective view of a tonneau cover system installed on a vehicle; the tonneau cover is in an open configuration.

A vehicle 10 is illustrated in FIG. 1 and in FIG. 2. The vehicle 10 comprises a bed or cargo area 12 and a passenger area or cab 14. The illustrated vehicle 10 is a pickup truck. However, the vehicle 10 may be any other vehicle, such as a utility vehicle, boat, trailer, ATV, UTV, semi-truck, dump truck, camper, etc.

The cargo area 12 may be defined by one or a plurality of walls. The walls may include opposing side walls 16A, 16B (i.e., driver and passenger side, respectively), a front wall 18 that is located adjacent to the passenger cab 14, and a rear wall or tailgate 20 that opposes the front wall 18. Two or more of these walls may be a single or integral wall. One or more of these walls may be split into two or more walls. For example, the tailgate, side wall, or front wall may be split into two or more walls to provide versatile access to the cargo area or passenger area of the vehicle.

The front wall 18 of the cargo area 12 may be a shared or common wall with a back wall of the passenger cab 14. Such vehicles may be a one piece or uni-body construction. In other vehicles, the front wall 18 may be a separate wall, segment, or portion of the vehicle from a rear wall of the passenger cab 14. In some configurations, the front wall 18 may provide access to the passenger cab 14 via a pass through or fold down wall or door. The cargo area 12 has a bottom or floor 22 that is surrounded by the walls 16A, 16B, 18, 20. The bottom or floor 22 is opposite a top or open end of the cargo area 12.

A tonneau cover system 24 may be positioned, located, installed, supported, or arranged on, onto, in, or over the cargo area 12. The tonneau cover system 24 may include a frame or rail system comprising one or more: opposing side rails 26A, 26B that are located or attached to corresponding side walls 16A, 16B of the cargo area 12 (and/or on the front or back walls 18, 20); a cover 28 that is supported on or by the frame system or side rails 26A, 26B; and a compartment 34 for the cover 28 to extend into and out of during movement of the cover 28 between the open and closed configurations. The cover 28 may include one or a plurality of slats 30 with one or a plurality of hinges between two or more adjacent slats 30. The tonneau cover system 24 may include one or more features or elements illustrated and described in US 2018/0118002A1, the contents of which is expressly incorporated by reference herein for all purposes.

The plurality of slats 30 may include a rear or tail slat 32 that is arranged at a rear-most end or position of the cover 28, at a location closest to the tailgate 20 when the cover 28 is in the closed configuration (FIG. 1). The tail slat 32 may be connected to an adjacent slat 30 via one or more hinges, such as hinge 42 in FIG. 5, 6 etc.

The one or more slats 30, 32 may be made of a plastic, metal, or composite material. The one or more slats may be an extruded or molded member. The one more slats 30, 32 may be machined or cut members. One or more of the slats 30, 32 may be rigid and therefore function to resist bending or flexing. One or more of the slats 30, 32 may be flexible or resilient, which may function to bend or flex. One or more of the features of the slats illustrated and/or described herein may be integrally formed with the slat during the manufacturing process. Alternatively, one or more of the features of slat illustrated and/or described herein may be attached to the slat via a secondary assembly process.

The compartment 34 may be a canister, box, shelf, or other container. The compartment 32 may be fixed or attached to the front wall 18, bottom or floor 22, and/or to one or both of the side walls 16A, 16B. In some configurations, the compartment 34 may be removable, such as the one described in U.S. Pat. No. 10,688,852B2, the contents of which is expressly incorporated by reference herein for all purposes. The compartment 34 is further illustrated/described in FIG. 16.

Figure 3:
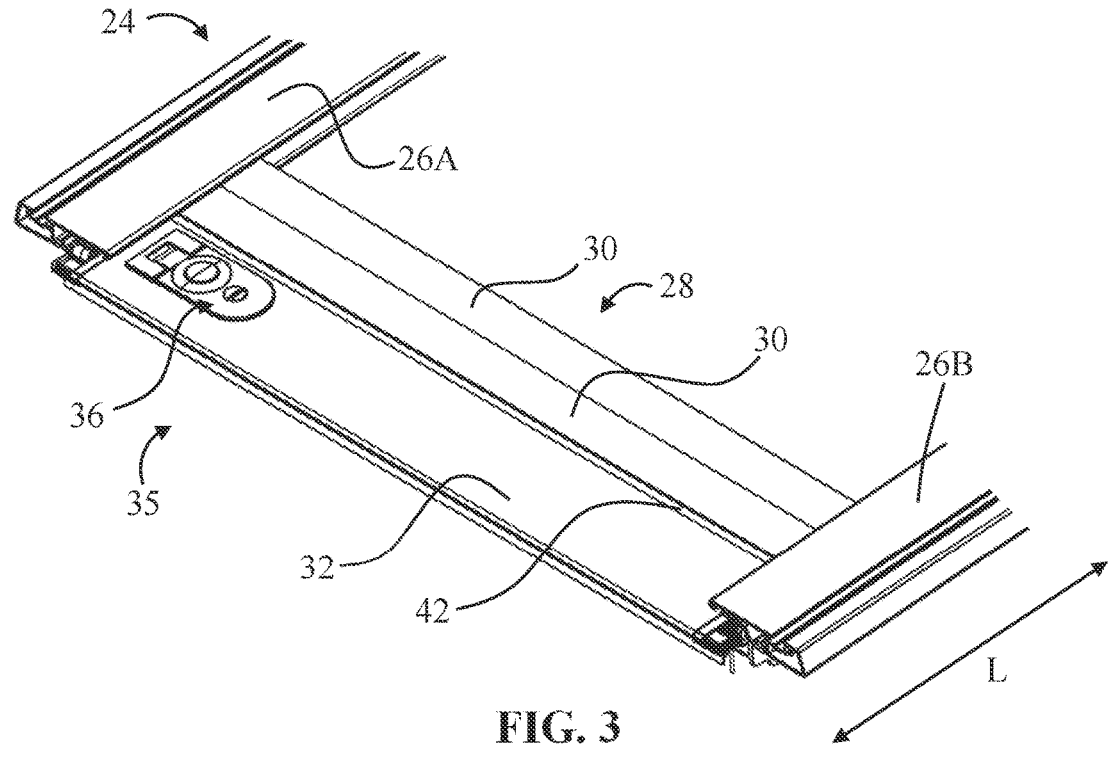
FIG. 3 is a perspective view of a rear slat, a slat connected to the rear slat, and the opposing side rails.
Figure 4:
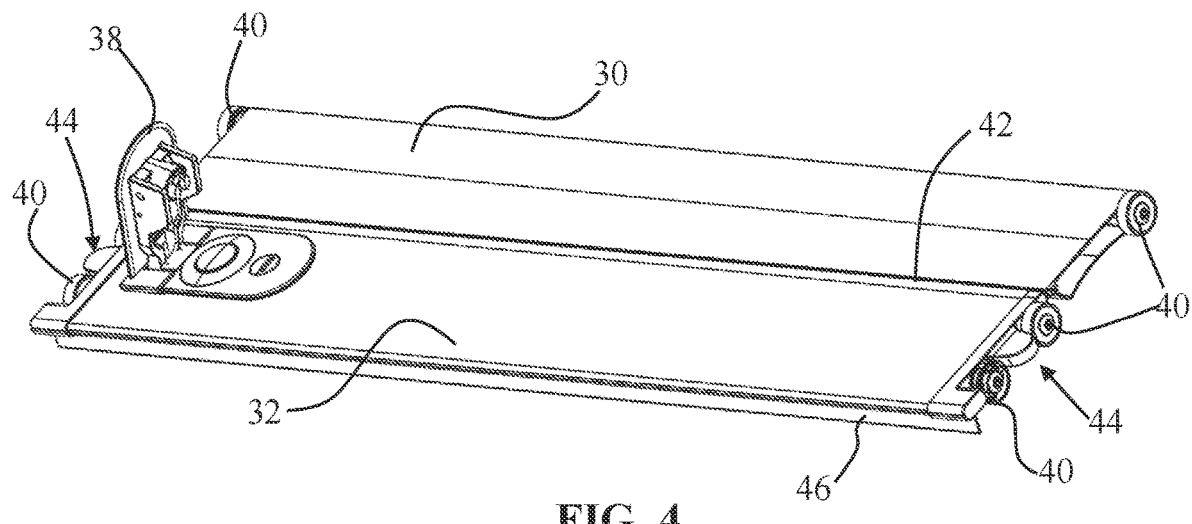
FIG. 4 is a perspective view of part of a rear slat and a slat connected to the rear slat.

FIG. 3 and FIG. 4 illustrate the tonneau cover system 24. The tonneau cover system 24 comprises opposing side rails 26A, 26B that are configured to be attached to the corresponding side walls 16A, 16B of the cargo area 12 (FIGS. 1 and 2). The side rails 26A, 26B may also be attached to the front wall 18 and/or to the compartment 34 that is supported or connected to the front wall 18 and/or side walls 16A, 16B. The side rails 26A, 26B may be made of a plastic, metal, and/or composite material. The side rails 26A, 26B may be extruded or molded members and/or may be machined, cut, stamped, etc.

The side rails 26A, 26B are configured to support the cover 28, the plurality of slats 30, 32, and/or any optional accessories installed on the side rails 26A/26B. More specifically, the slats 30, 32 may be moveably supported within a channel or a support or contact surface of each side rail 26A, 26B and configured to move along a length L of the side rails 26A, 26B as the cover 24 is moved between the closed and open configurations.

While the cover 28 is illustrated as having a rear slat 32 connected to the slat 30 via one or more a hinges 42, it is understood that additional slats that are not illustrated may be connected to the slat 30. Each of the additional slats may be connected to slat 30 via one or more hinges 42 or other connecting members. The one or more hinges 42 function to allow the cover 28 and slats 30, 32 to bend, move, articulate, flex, etc. as the cover 28 is moved into and out of the canister and between the open and closed positions. Moreover, the one or more hinges may function to allow one or more of the slats to move or be n a difference vertical or even horizontal plane or location relative to other slats to take up any manufacturing and/or installation tolerances of the cover assembly, the slats, vehicle bed walls, etc.

Figure 9:
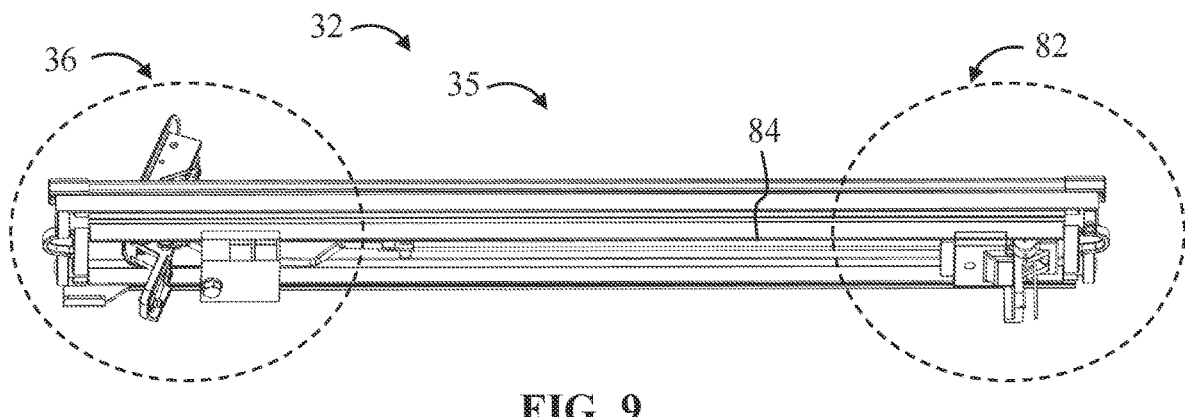
FIG. 9 is a bottom perspective view of the rear slat.

The cover system 24 may include one or more lock assemblies 35. A lock assembly 35 may be configured to lock and unlock the tonneau cover system 24 and/or the cover 28. The lock assembly 35 may be configured to lock or maintain the cover 28 in a certain position along the length L of the rails 26A, 26B, at the closed configuration, at the open position, and/or or in a region between the closed configuration and the open configuration. The lock assembly 35 may be configured to allow the cover 28 and/or the slats 30, 32 to move along a length L of the side rails 26A, 26B. The lock assembly 35 may include a first locking device 36. The lock assembly 35 may also include a second locking device 82 (FIG. 9, 11, 13, 14). While the first locking device 36 is illustrated on the driver side of the rear slat 32, the first locking device 36 and/or handle may also or may instead be located on the passenger side of the rear slat 32 or in the middle of the slat 32. While the lock assembly 35 is located on the rear slat 32, the lock assembly 35 or components of the lock assembly may also or may instead be located on one or more of the other slats 30 that are located between the tail slat 32 and the front end of the cargo area of the vehicle.

The first locking device 36 may include a handle 38 that can be grasped by a user and pushed or pulled to manually move the cover 28 between the closed and open positions. Of course, the handle 38 and/or the cover 28 can be configured to be automatically moved between the open and closed positions via one or more motors, actuators, pistons/cylinders, etc.

One or more of the slats 30, 32 may include one or more rollers 40. The rollers 40 may be provided on one side (i.e., only the driver or passenger side) or on both sides (driver and passenger side) of one or more of the slats 30, 32. In some configurations, one or more of the rollers 40 may be replaced with one or more sliders or blocks. The one or more rollers 40 may roll and/or slide along a length of the side rails 26A, 26B between the closed and open positions. Preferably, the surface been the rollers 40, slaiders, blocks, etc, and the side rails 26A,B is low friction to allow the cover to freely move or slide. However, in some configurations or certain regions of the side rails 26A, B may be of higher friction to restrict free movement of the cover and/or to maintain a position of the cover even without locking the cover with the lock assembly.

The one or more rollers 40 may be provided to engage, roll or slide within a channel 64 (FIG. 8) on the rail 26A, rail 26B, or both rails 26A, 26B when the cover 28 is moved between the open and closed configurations. The roller 40 may be a bearing, a roller bearing, a wheel, an axle, etc. The roller 40 may spin ab out the axle or may be restricted from spinning and instead may just slide.

For example, the rear or tail slat 32 may include one or more rollers 40 (or two rollers 40 as illustrated). One or more of the slats 30 attached to the rear or tail slat 32 may also include one or more rollers 40. In some configurations, a slat 30, 32 may include zero rollers 40. One or more of the rollers 38 may include an axle 52 that are configured to engage a roller channel 50 on the slat 30, 32.

Adjoining slats may be connected via one or more hinges. A hinge 42 may be configured to allow adjacent slats to move, bend, flex, or articulate relative to adjacent slats. A hinge 42 may be made of a suitable material such as plastic, rubber, or elastic or other pliable, bendable, flexible, articulatable material. The hinge 42 may be a discrete piece that is attached or connected to the slats 30, 32. In some configurations, the hinge 42 may be part of one or both of the slats 30, 32 and function as a living hinge. In some configurations, the hinge 42 may be molded or extruded with the slat 30, 32 material in a single or subsequent manufacturing process. A hinge 42 may be received into or engage a hinge channel defined at an end of the slat 30, 32. A hinge 42 may be received into a hinge channel by sliding or guiding the hinge into the channel in a cross-car direction. In other configurations, the hinge may be snapped or pressed into a channel. In other configurations, the hinge may be connected to adjacent slats via one or more fasteners (i.e., adhesive, pins, etc.)

One or more of the slats 30, 32 may include one or more end caps 44. The end cap 44 may be located on one or on both sides of one or more of the slat 30, 32. Some slats 30, 32 may be free of an end cap 44. For example, only the tail slat 32 may include an end cap 44. Or one or more of the other slats 30 may or may not include an end cap.

One or more of the slats 30, 32 may include one or more seals 46. The seal 46 may be a weatherstrip or brush or molding. The one or more seals 46 may function to restrict or prevent liquid, water, dirt, and/or debris from entering the inside of the cargo area when the cover 28 is in a closed configuration. The seal 46 may be configured to engage or compressed against the tailgate 20 the when the cover 28 is in a closed configuration. In some configurations, the seal may be provided between adjacent slats 32, 30 or 30, 30. In other configurations, a seal may be provided to engage a top or bottom surface of the slats 30, 32 and may be located on the side rail 26A, 26B, such as the seal that may be supported in the seal channel 78 in FIG. 8. In some configurations one or more seals may be provided at the lateral ends of one or more of the slats to prevent dirt, liquid, and/or debris from entering the cargo area. In some configurations, one or more seals may be provided at the forward end of the cover to restrict or prevent dirt, debris, and/or liquid from entering the compartment 34 into which the cover 28 is configured to be moved into and out of. In some configurations, the seal may include an adhesive (peel and stick) that is attached to the slat 30, 32.

Figures 5, 6:
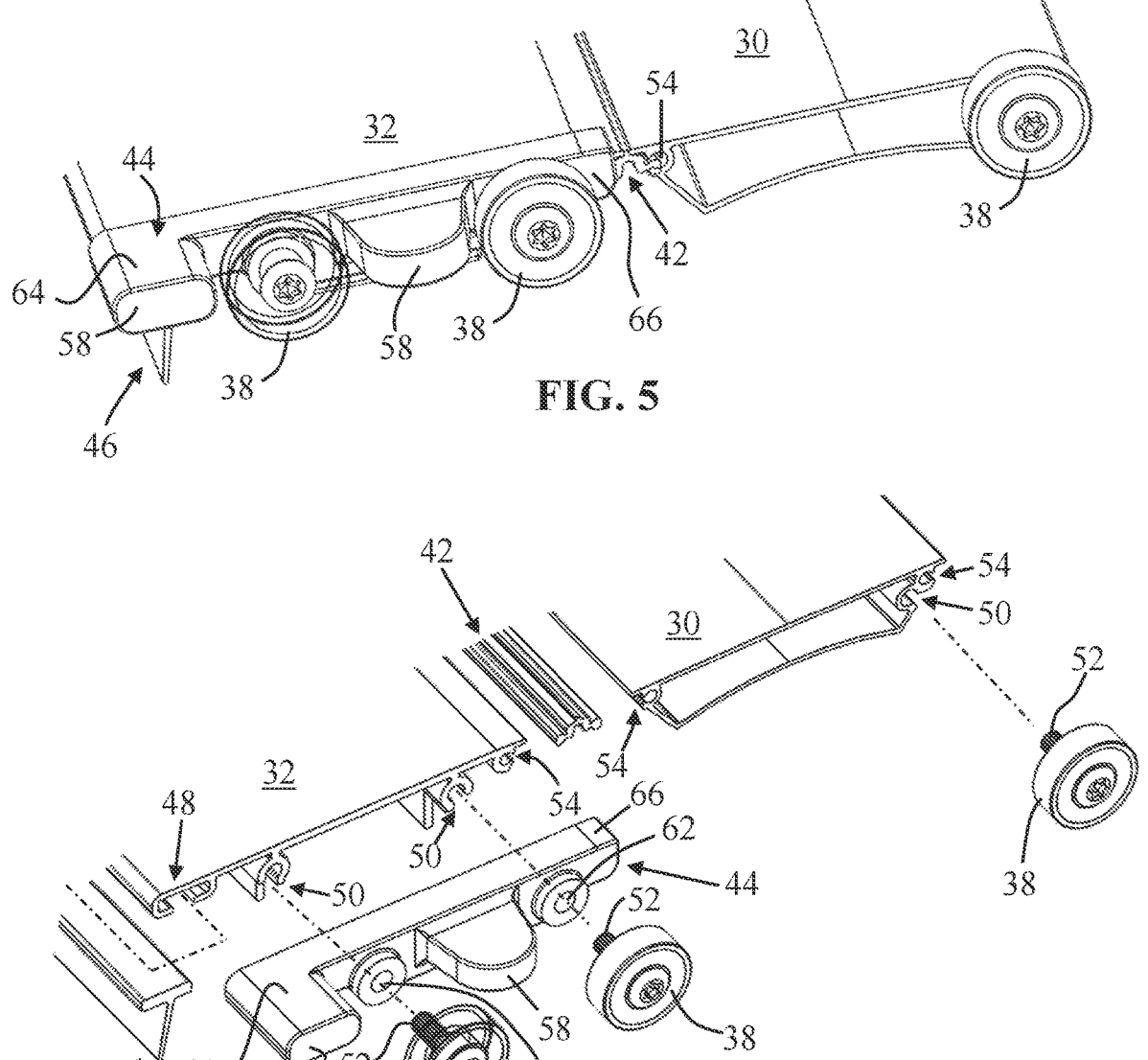
FIG. 5 is a perspective view of part of a rear slat and a slat connected to the rear slat.
FIG. 6 is an exploded view of part of a rear slat, a hinge, and a slat.

FIG. 5 and FIG. 6 further show the slats 30, 32. Tail slat 32 may include one or more seal channels 48 for the seal 46 to engage to connect the seal 46 to the tail slat 32. The seal channel 48 may have a suitable cross-section, such as a U-, C-, and/or T-shape. The seal channel 48 may be located at a trailing end of the slat 32. However, in some configurations, the seal channel 48 may be located at the leading end of the slat 32 and/or at either end or side of the slat 30. A dry or liquid adhesive may be added to help retain the seal 46 at the slat.

Slats 30, 32 may include one or more roller channels 50. A roller channel 50 may be configured to connect a roller 40 to the slat 30, 32. For example, an axle 52 of the roller 40 may be received into a roller channel 50 to connect the roller to the slat 30, 32. A roller channel 50 may be located at opposite ends of a slat 30, 32. In some configurations, a roller channel 50 may be located in the middle of a slat 30, 32 in a region equally between the ends of a slat 30, 32. In other configurations, one or more of the roller channels 50 may be located closer to a leading or trailing end of the slat 30, 32.

Slats 30, 32 may include one or more hinge channels 54. A hinge channel 54 may be configured to connect a hinge 42 to the slat 30, 32. A hinge 42 may be configured to join together two adjacent slats 30, 32 and/or slats 30, 30. Accordingly, a hinge channel 54 may be located at a leading and trailing end of slat 30, and at a leading end of tail slat 32.

Figure 8:
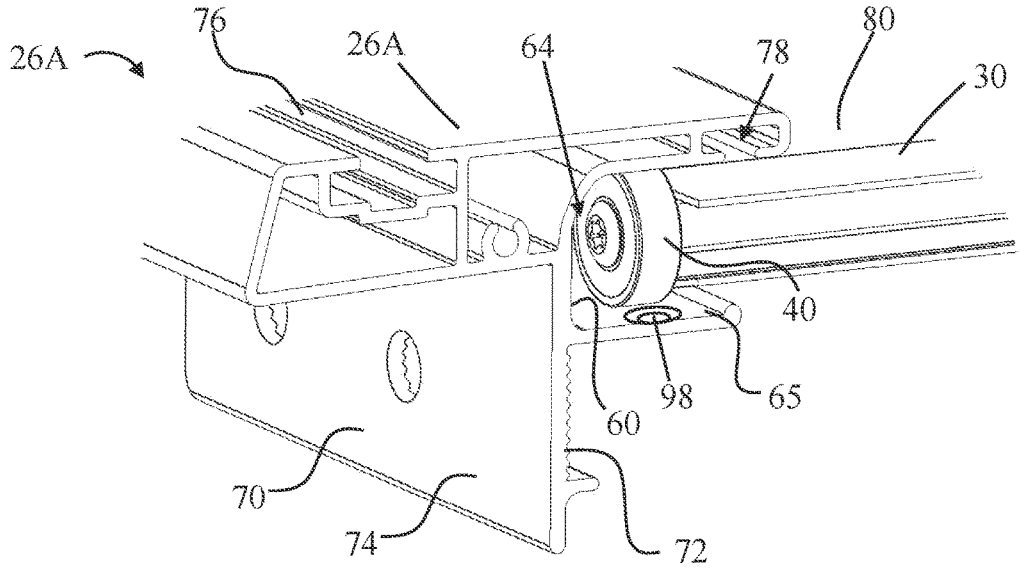
FIG. 8 is a perspective view of part of the side rail and a slat.

Slats 30, 32 may include an end cap 44. An end cap 44 may be configured to locate the slats 30, 32 and/or the cover 28 in a cross-car direction. The end cap 44 may have one or more contact surfaces 58 that are configured to engage or contact a side wall or connecting surface 60 on the side rails 26A/B (FIG. 8). In this regard, the end cap 44 and/or contact surface 58 may be or may function as a bumper or sliding surface that contacts the side wall 60 to restrict or prevent the cover 28 from binding between the side rails 26A, 26B during movement of the cover 28. In some configurations, the contact surface 58 may always be in contact with the side wall 60. In other configurations, the contact surface 58 may be free from direct contact with the side wall 60 but contact the side wall 60 on occasion during movement of the cover 28 when the cover 28 slightly twists or moves out of alignment between the side rails.

The end cap 44 may function to cover a portion of the seal 46 and/or hinge 42. In other words, as perhaps best seen in FIG. 5, FIG. 6, and FIG. 14, after the end cap 44 is installed on the slat 30, 32, at least part of the seal channel 48 and hinge channel 54 is covered by the end cap 44 which may function to prevent the seal 46 and hinge 42 from being inadvertently removed from within the respective channel 48, 54.

The end cap 44 may function to cover a portion of the second locking member 92. That is, referring to FIG. 14, after the second locking member is installed on the tail slat 32, at least part of the channel of the tail slat 32 is covered by the end cap 44 which may function to prevent the second locking member 92 from being inadvertently removed from within the respective channel.

The end cap 44 may include one or more roller slots 62 that are generally aligned with the one or more roller channels 50 in the slat 30, 32. The axle 52 of the roller 40 may extend through the one or more roller slots 62. The roller slot 62 may function to provide additional support for the axle 52 and/or roller 40.

Figure 7:
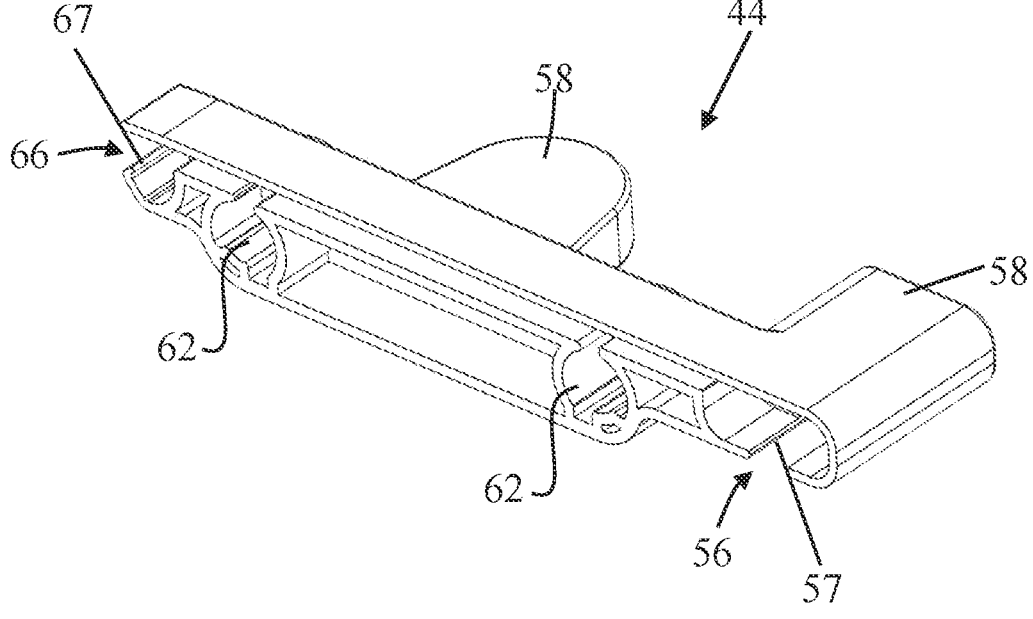
FIG. 7 is a perspective view of an end cap.

FIG. 7 illustrates the end cap 44. The end cap 44 includes one or more contact surfaces 58 that are configured to engage or contact a connect surface 60 on the side rails 26A/B (FIG. 8). The end cap 44 includes a seal cap 56 region that is configured to cover the seal 46 and the seal channel 48 (FIGS. 5 and 6) to prevent the seal 46 from being inadvertently removed from within the channel 48. The seal cap 56 has a seal cap slot 57 that allows at least part of the seal 46 to extend through the seal cap 56 and/or end cap 44 (See also FIG. 14).

The end cap 44 includes a hinge cap 66 region that is configured to cover the hinge 42 and the hinge channel 54 (FIGS. 5 and 6) to prevent the hinge 42 from being inadvertently removed from within the hinge channel 54. The hinge cap 66 has a hinge cap slot 67 that allows at least part of the hinge 42 to extend through the hinge cap 66 and/or end cap (See also FIG. 14).

The end cap may be made of a single material or two or more materials. For example, the contact surface 58 may be made of a soft or flexible material, and the base part or connection parts 56, 57, 62, 66, etc. may be made of a more rigid material to provide an adequate connection with the mating parts. Alternatively, the base or connection parts 56, 57, 62, 66, etc. may be made of a partially flexible or pliable material to allow the features to be flexible to make the connection with the mating part.

FIG. 8 illustrates side rail 26A. Side rail 26B (not illustrated here) may be a mirror image of side rail 26A and therefore any remarks relating to side rail 26A may relate to side rail 26B and vice versa.

The side rail 26A comprises a channel 64 into which one or more slats 32, 30 and/or the one or more rollers 40 are received. The channel 64 may be defined by a bottom wall 65 or support surface that the rollers 40 are configured to roll or slide on; an upright side wall 60 that may also be a contact surface, against which the one or more contact surfaces 58 of the end cap 44 are configured to engage, and a top wall. Therefore, the channel 64 may have a U- or C-shape. The bottom wall 65 or support surface on which the one or more rollers 40 are supported on and configured to roll or slide on may include one or more locking apertures 98 (See also FIG. 15). There may be any number of locking apertures 98 along the length of the side rails 26A, 26B, including only one locking aperture 98. As will be discussed further below, a locking pin or surface may engage the locking aperture to lock or prevent movement of the cover 28. The locking aperture may have any suitable size and/or shape (circular, oval, square, diamond, etc.).

The side rail 26A may have a downwardly turned flange portion 70 having an inside surface 72 and an outside surface 74. The outside surface 74 is configured to be pressed or clamped against the inside wall of the side wall of the cargo area when the side rail 26A is attached to the vehicle 10. A clamp may engage the inside surface 72 to attach the side rail 26A to the side wall 16A.

The side rail 26A may include a mounting slot 76. The mounting slot 76 may be configured to attach an accessory to the side rail 26A or cover system 24. For example, a ladder rack or toolbox may be attached to the mounting slot 76. The mounting slot 76 may have a suitable cross-section, such as a U-, C-, or T-shape.

The side rail 26A may include one or more seal channels 78 for a seal, brush, or weatherstrip to engage. The seal, brush, or weatherstrip may contact a top surface 80 of the slats 30, 32 or be offset from the top surface of the slats 30, 32 without making contact.

FIG. 9 illustrates the tail slat 32. A lock assembly 35 may be attached to or located on the tail slat 32. However, in some configurations, the locking assembly 35, or components thereof, may be located on one of the other slats 30 that are not necessarily the tail slat. The locking assembly 35 may comprise a first locking device 36 and/or a second locking device 82. In other words, certain locking assemblies 35 may make use of only first locking device 36, only the second locking device 82, or of both devices 36, 82. The two devices 36, 82 may be connected via one or more connecting rods 84.

Figure 10:
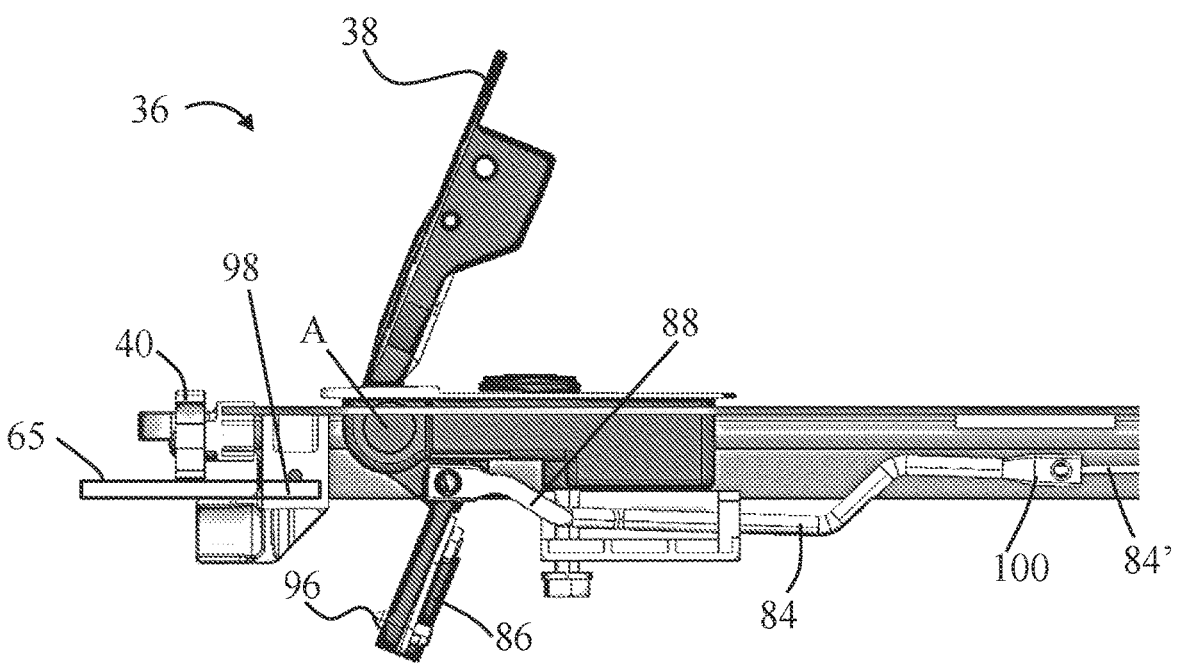
FIG. 10 is a side view of part of the rear slat and the first locking device of the lock assembly in an open or unlocked position.

FIG. 10 illustrates the first locking device 36. The first locking device 36 or elements thereof may be located at the driver side, the passenger side, or both. The first locking device 36 comprises a handle 38 that is operatively connected to a first locking member 86 and operatively connected to a first connecting member 88. Upon movement of the handle 38, the first locking member 86 and the first connecting member 88 are configured to move. More specifically, upon rotation of the handle 38 about the axis A, the first locking member 86 and the first connecting member 88 are also configured to rotate about the axis A. The first connecting member 88 is operatively connected to the connected rod 84 so that movement of the first connecting member 88 results in movement of the connecting rod 84. The connecting rod 84 may be a rigid member such as rod, dowel, threaded rod, etc. The connecting rod 84 may be a flexible member such as a cable, belt, chain, band, wire, etc.

The connecting rod 84, which connects the first locking device 36 and the second locking device 82, comprises an adjustment member 100 making the connecting rod 84 adjustable. In other words, a length of the connecting rod 84 is adjustable so that the actuation of the locking device 36 can be fine-tuned and adjusted. An adjustable connecting rod 84 also advantageous allows for a standard-length connecting rod 84 to be used across several tail slat 32 lengths to accommodate various cover platforms. The adjustment member 100 may be a set screw, that can be loosened and tightened to adjust a position where the set screw contact the second part 84' of the connecting rod 84.

Figure 11:
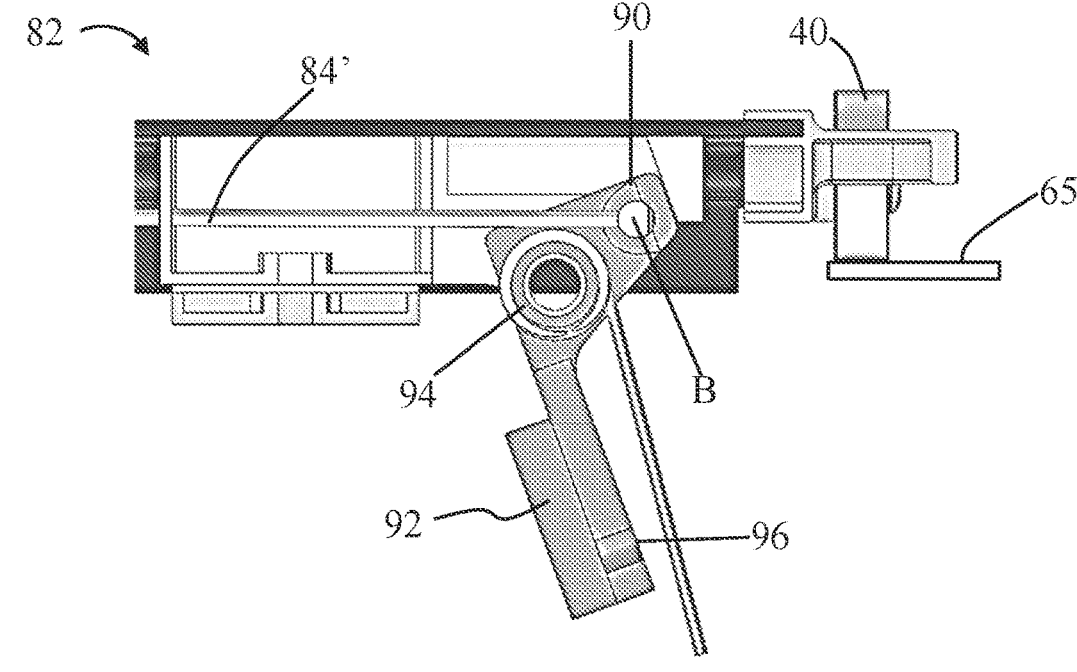
FIG. 11 is a side view of part of the rear slat and the second locking device of the lock assembly in an open or unlocked position.

FIG. 11 illustrates the second locking device 82. The second locking device 82 or elements thereof may be located at the driver side, the passenger side, or both. The second locking device 82 comprise a second connecting member 90 and a second locking member 92. The second connecting member 90 is operatively connected to the connecting rod 84 or 84'. Upon movement of the connecting rod 84 or 84', the second connecting member 90 is configured to move or rotate about axis B, which in turn causes the second locking member 92 to also move or rotate about axis B. The second locking device 82 may also includes a biasing member or torsion spring 94.

Referring to both FIG. 10 and FIG. 11, the locking device 36 is illustrated in an open or unlocked configuration. This means that the cover 28 is free to move, slide, or roll between an open and closed configuration, along a length L of the side rails 26A, 26B. In the open or unlocked configuration of FIG. 10 and FIG. 11, the first locking member 86 and/or the second locking member are free from engaging the corresponding side rail 26A, 26B.

Figure 12:
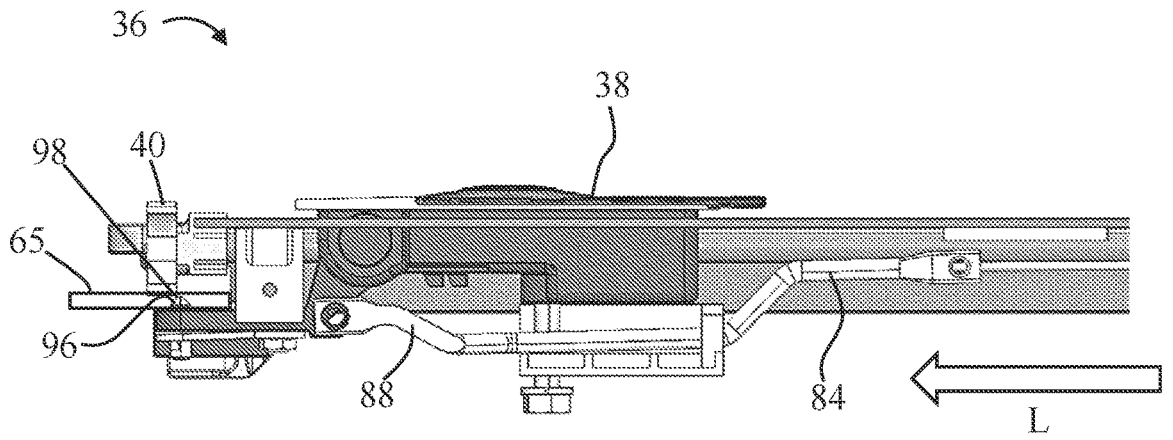
FIG. 12 is a side view of part of the rear slat and the first locking device of the lock assembly in a closed or locked position.
Figure 13:
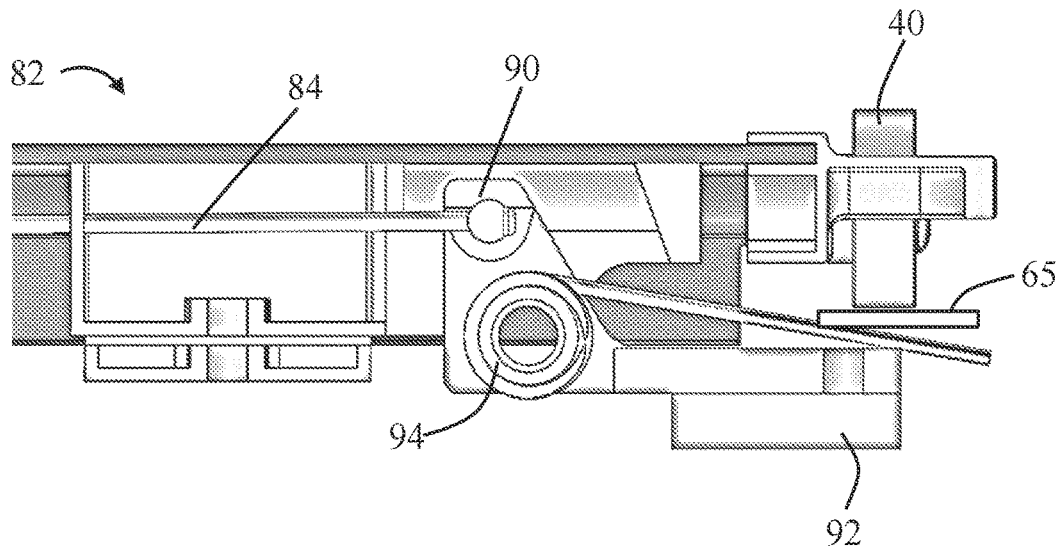
FIG. 13 is a side view of part of the rear slat and the second locking device of the lock assembly in a closed or locked position.

FIG. 12 and FIG. 13 illustrate the first locking device 36 and the second locking device 82 in a closed or locked configuration. In the closed or locked configuration, the cover 82 is restricted from moving, sliding, or rolling between the open and closed configuration, along a length L of the side rails 26A, 26B. In the closed or locked configuration of FIG. 12 and FIG. 13, the first locking member 86 and/or the second locking member engage with the corresponding side rail 26A, 26B.

Referring to FIGS. 10-13, to close or lock the cover system 24, the handle 38 can be moved from the unlocked position (FIG. 10) to the locked position (FIG. 12). This may include moving or pivoting the handle 38 from a generally vertical orientation a downward direction to a generally horizontal orientation. Of course, other movements are contemplated, such as moving from a horizontal to a vertical position, or any positions in between. In other configurations, the movement may be electrically actuated via one or more motors, switches, controllers, cylinders, etc.

Due to the operative connection between the handle 38 and the first locking member 86, upon movement, rotation, or pivoting of the handle 38 into the locked position, the first locking member 86 is also moved or pivoted into a locked position, where the locking pin 96 contacts, engages, or partially extends into or through a locking bore 98 defied in the bottom wall 65 of channel 64 of side rail 26A (SEE also FIG. 8). In other words, the locking member 86 is moved or articulated in an upward direction towards a bottom surface of the bottom wall 65 of the channel 64 of the side rail 26A. The bottom surface may be opposite a top surface of the bottom wall 65 on which the one or more rollers 30 are supported.

While the locked position is described as having the locking pin 96 engage the locking aperture 98 other ways of locking may be accomplished, including using one or more magnets on the first locking member 86 that engage a magnet or magnetic surface of the side rail 26A/B, or simply a friction or interference fit between the locking member 86 and the side rail 26A/B. Accordingly, the tail slat 32 is fixed or locked to the side rail 26A and prevents the tail slat 32 and thus the rest of the slats 30 and cover 28 from any movement along the L of the side rails 26A, 26B.

Due to the operative connection between the handle 38 and the first connecting member 88, upon movement of the handle 38 into the locked position of FIG. 12, the first connecting member 88 is moved in a direction L, which applies tension on the connecting rod 84 and pulls the connecting rod 84, which actuates the second locking device 82. Movement or pulling of the connecting rod 84 causes the second connecting member 90 and therefore the second locking member 92 to move or pivot upwardly into a locked position (FIG. 13), where a locking surface or second locking pin 96 contacts, engages, or partially extends into or through a locking aperture defied in the bottom surface of the bottom wall 65 of channel 64 of side rail 26B. This locks the tail slat 32 to the side rail 26B and prevents the tail slat 32 and thus the rest of the slats 30 and cover 28 from any movement along the L of the side rails 26A, 26B.

Upon movement or rotation of the second connecting member 90, the spring or torsion spring 94 may be wound up, causing the spring 94 to store energy. The storing of the energy in the torsion spring 94 helps return the lock assembly 35 into the unlocked position upon movement or actuation of the handle 38 from the locked position (FIG. 12) to the unlocked position (FIG. 10). Of course, it is foreseeable to instead have the torsion spring at the first locking device 36 and function how the spring does in the locking device 82. Alternatively, both locking devices 36, 82 may include a spring or torsion spring to provide redundancy to the system to ensure the desired unlocking and locking movement of the handle and assemblies during use. In some configurations, a spring or torsion spring may also, or may instead, be located in a region between the two locking devices to ensure the connecting rod or wire is moved or retracted into the appropriate position after articulation of the assembly.

Figure 14:
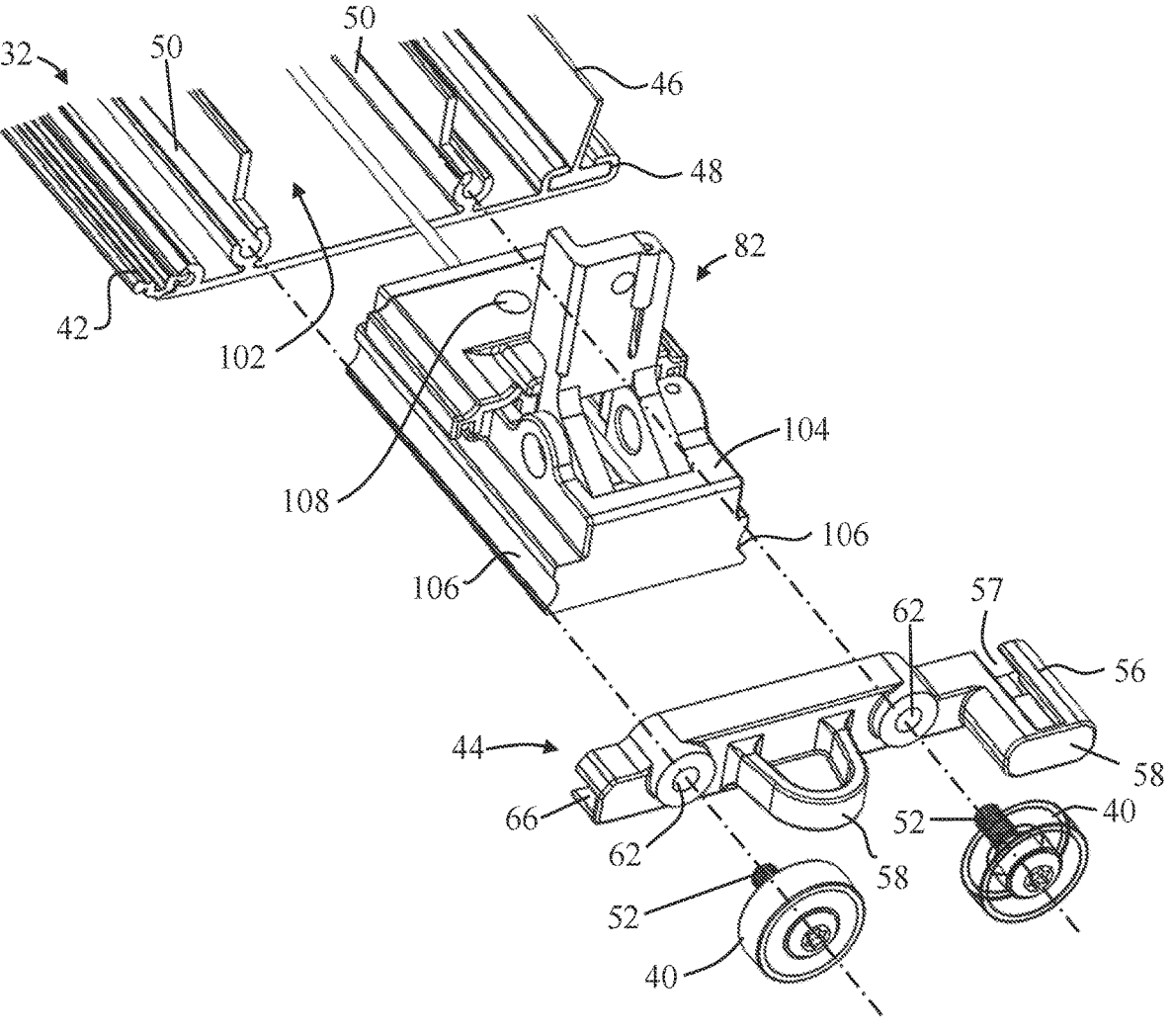
FIG. 14 is an exploded perspective view of the second locking device and the rear slat.

FIG. 14 illustrates the second locking device 82 and part of the rear slat 32. The back or B-side of the rear slat 32 has a receiving slot 102 configured to receive the second locking device 82. The receiving slot 102 may be defined between the two roller channels 50.

The second locking device 82 comprises a base 104 having one or more retaining features 106. The one or more retaining features 106 may be located on opposite lateral sides of the base 104 and may complement the shape of the two opposing roller channels 50. For example, the roller channels 50 may each have a rounded or convex shape and therefore the retaining features 106 may have a complimentary rounded or concave shape. The base 1-4 may be inserted in between the roller channels 50 and fixed thereto in a fore-aft direction. The base may include a fastener and bore 108 to fix the base 104 and second locking device 82 to the slat 32.

The end cap 44 may then be installed onto the slat 32 such that the end cap 44 contacts and holds the second locking device 82 from inadvertently being removed from within the receiving slot 102. This may be especially important if the fastener 108 is omitted. The rollers 40 may then be installed by passing the axis 52 through the roller slots 62 in the end cap 44 and into the roller channels 50 of the slat 32. The end cap 44 may therefore be sandwiched between the rollers 40 and the slat 32. The axles 52 may threadably engage the roller channels 50 to prevent the rollers 40 from inadvertently separating from the slat 32. Of course, the axles 52 may instead be press fit or secured thereto via one or more fasteners (adhesives, pins, etc.

The foregoing description of locating the second locking device 82 to the bottom of the slat 30, 32 may also apply to the first locking device 36. In other words, the first locking device 36 may be received into a similar receiving slot 102 on the bottom of the slat 30, 32 and secured thereto via one or more fasteners and/or end caps.

Figure 15:
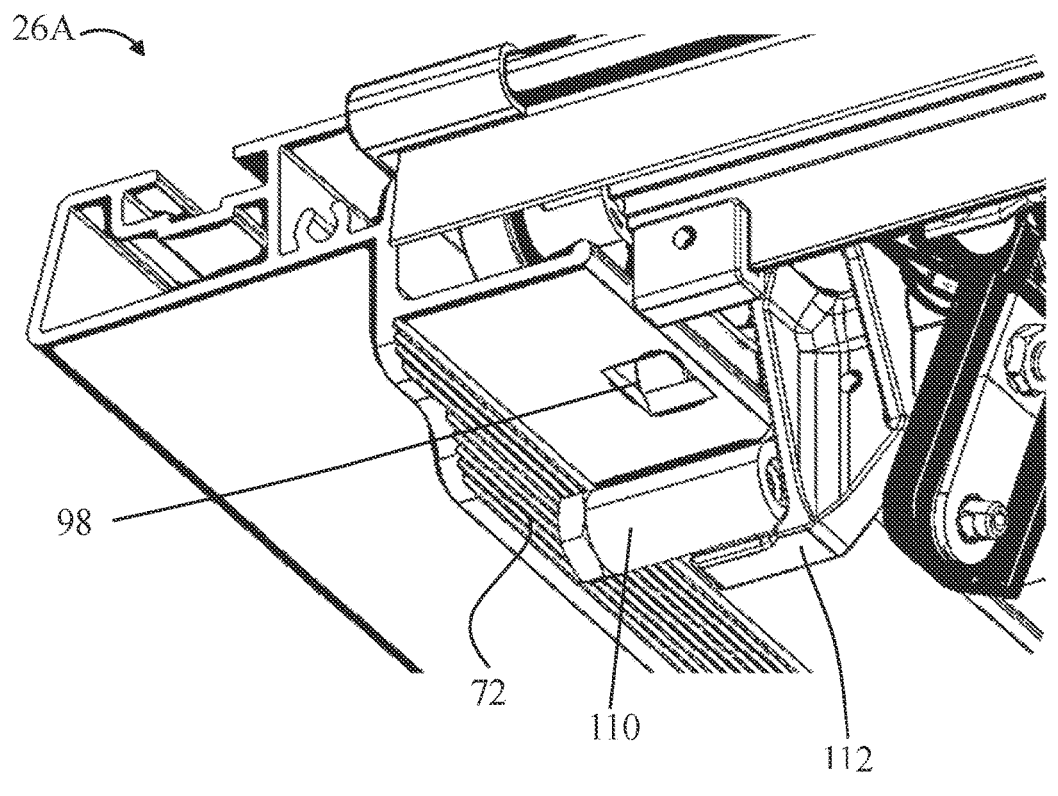
FIG. 15 is a bottom perspective view of part of the rear slat and side rail.

FIG. 15 illustrates the side rail 26A from below. The tonneau cover system 24 may comprise a positive stop feature 110. The positive stop feature 110 may extend from the side rail 26A in a direction towards a center of the cargo area of the vehicle. The positive stop feature 110 may extend from the flange 72 in a generally horizontal direction; however, an angled direction (up or down) is also foreseeable. The positive stop feature 110 is configured to restrict or prevent the cover 28 from being moved or closed beyond a predetermined closed position. In other words, the positive stop feature 110 may be engaged by or contact a corresponding feature of the cover 28 or slat 30, 32 to restrict or prevent any further movement in the closed direction. The positive stop feature 110 may be a pin or member that extends from the downwardly turned flange 72 of the side rail 26A. The tail slat 32 may include a mating arm, pin, or positive stop 112. Upon movement of the cover 28 in the closed position (i.e., in a direction towards the tailgate 20), the positive stop or pin 112 of the cover 28 or tail slat 32 will contact the positive stop 110 of the rail 26A and thereby restrict or prevent any further movement in the closed direction. The positive stops may be tuned so that the cover 28 or tail slat 32 is free from making direct contact with the tailgate 20 or may be tuned to prevent further movement of the cover 28 just after connecting is made. This may advantageously prevent the cover 28 or rear slat 32 from slamming into the tailgate, which may undesirably cause damage to the tailgate 20, rear slat 32, and/or cover 28. The other side of the cover 28 may also or may instead include the positive stop features on rail 26B.

Figure 16:
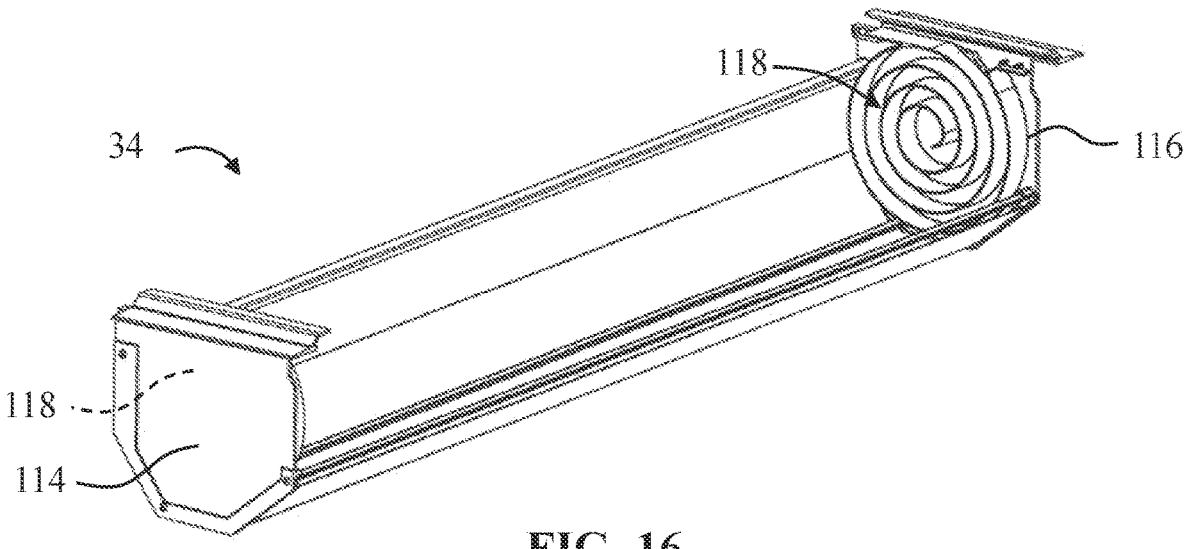
FIG. 16 is a perspective view of a compartment.

FIG. 16 illustrates an exemplary compartment 38. The compartment may be connected to the front wall 18, side walls 16A, 16B, bottom floor 22, or a combination thereof. The compartment 34 may comprise opposing tracks 118 on opposing side walls 114, 116 into which the cover 28 or slats 30, 32 may be rolled into when the cover 28 is moved into an open configuration. The cover 28 or slats 30, 32 may move out of the opposing tracks when the cover is moved into a closed configuration. While the tracks 114 are illustrated as having a circular or spiral configuration, the tracks 114 may instead have an elongated or waterfall configuration, such as the tracks illustrated and described in U.S. Pat. No. 10,737,563, the entire disclosure of which is hereby incorporated by reference herein for all purposes.

It is understood that the following method steps can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a motor" does not limit the teachings to a single motor. Instead, for example, disclosure of "a motor" may include "one or more motors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be or may not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

LISTING OF REFERENCE NUMERALS 10 vehicle
12 cargo area or bed
14 passenger area or cab
16A/B walls of cargo area
18 front wall
20 tailgate
22 bottom or floor of cargo area
24 cover system
26 frame or rail system 26A/B side rails
28 cover
30 slats
32 rear slat or tail slat
34 compartment
35 Lock Assembly
36 locking device, first locking device
38 handle
40 roller
42 hinge
44 end cap
46 seal
48 seal channel
50 roller channel
52 axle
54 hinge channel
56 seal cap (end cap 44)
58 contact surface (end cap 44)
60 side wall or contact surface (side rail 26A/B)
62 roller slots
64 channel (side rail 26A)
65 bottom wall of channel 64
66 hinge cap
70 downwardly turned flange
72 inside surface of 70
74 outside surface of 70
76 mounting slot
78 seal channels
80 top surface of slat 30, 32.
82 second locking device
84 connecting rod
86 first locking member
88 first connecting member.
90 second connecting member
92 second locking member
94 torsion spring
96 locking surface, second locking pin
98 locking aperture
100 adjustment member
102 receiving slot
104 base
106 retaining features
108 bore and fastener
110 positive stop
112 positive stop
114 side wall of canister 34
116 side wall of canister
118 track

The invention claimed is:

1. A tonneau cover system for covering a cargo area of a vehicle, the tonneau cover system comprising:
   a side rail configured to attach to a side wall of the cargo area of the vehicle, the side rail comprising a bottom wall;
   a cover comprising a plurality of slats, the plurality of slats comprising a tail slat connected to a slat, the tail slat comprising one or more rollers that are supported on a top surface of the bottom wall of the side rail;
   a lock assembly connected to the tail slat, the lock assembly comprising a first locking device connected to the tail slat, the first locking device comprising a first locking member that is configured to engage a bottom surface of the bottom wall of the side rail to lock or restrict movement of the cover relative to the side rail; and
   wherein the side rail comprises a stop element that extends from the side rail towards a center of the cargo area, and the tail slat comprises a positive stop feature that is configured to contact the positive stop feature to restrict or prevent further movement of the cover.

2. The tonneau cover system according to claim 1, wherein the bottom wall comprises a locking aperture and the first locking member comprises a locking pin that engages the locking aperture to lock or restrict movement of the cover relative to the side rail.

3. The tonneau cover system according to claim 1, wherein the side rail is a first side rail, the side wall is a first side wall, the bottom wall is a first bottom wall, the bottom surface is a first bottom surface, the tonneau cover system includes a second side rail configured to attach to a second side wall of the cargo area of the vehicle, the second side rail includes a second bottom wall, the second bottom wall defines a second bottom surface, the lock assembly comprises a second locking device comprising a second locking member that is configured to engage the second bottom surface of the second bottom wall of the second side rail to lock or restrict movement of the cover relative to the second side rail.

4. A tonneau cover system for covering a cargo area of a vehicle, the tonneau cover system comprising:
   a side rail configured to attach to a side wall of the cargo area of the vehicle, the side rail comprising a bottom wall;
   a cover comprising a plurality of slats, the plurality of slats comprising a tail slat connected to a slat, the tail slat comprising one or more rollers that are supported on a top surface of the bottom wall of the side rail;
   a lock assembly connected to the tail slat, the lock assembly comprising a first locking device connected to the tail slat, the first locking device comprising a first locking member that is configured to engage a bottom surface of the bottom wall of the side rail to lock or restrict movement of the cover relative to the side rail;
   wherein the side rail is a first side rail, the side wall is a first side wall, the bottom wall is a first bottom wall, the bottom surface is a first bottom surface, the tonneau cover system includes a second side rail configured to attach to a second side wall of the cargo area of the vehicle, the second side rail includes a second bottom wall, the second bottom wall defines a second bottom surface, the lock assembly comprises a second locking device comprising a second locking member that is configured to engage the second bottom surface of the second bottom wall of the second side rail to lock or restrict movement of the cover relative to the second side rail; and
   wherein the lock assembly comprises a connecting rod that extends along a bottom surface of the tail slat and that connects the first locking device and the second locking device.

5. The tonneau cover system according to claim 4, wherein the connecting rod comprises an adjustment member to adjust a length of the connecting rod.

6. The tonneau cover system according to claim 3, wherein the cover comprises a hinge that connects the tail slat to the slat, and an end cap that is configured to engage a side of the tail slat, wherein the end cap contacts part of the hinge.

7. A tonneau cover system for covering a cargo area of a vehicle, the tonneau cover system comprising:
   a side rail configured to attach to a side wall of the cargo area of the vehicle, the side rail comprising a bottom wall;
   a cover comprising a plurality of slats, the plurality of slats comprising a tail slat connected to a slat, the tail slat comprising one or more rollers that are supported on a top surface of the bottom wall of the side rail;
   a lock assembly connected to the tail slat, the lock assembly comprising a first locking device connected to the tail slat, the first locking device comprising a first locking member that is configured to engage a bottom surface of the bottom wall of the side rail to lock or restrict movement of the cover relative to the side rail;
   wherein the side rail is a first side rail, the side wall is a first side wall, the bottom wall is a first bottom wall, the bottom surface is a first bottom surface, the tonneau cover system includes a second side rail configured to attach to a second side wall of the cargo area of the vehicle, the second side rail includes a second bottom wall, the second bottom wall defines a second bottom surface, the lock assembly comprises a second locking device comprising a second locking member that is configured to engage the second bottom surface of the second bottom wall of the second side rail to lock or restrict movement of the cover relative to the second side rail;
   wherein the cover includes an end cap that is configured to engage a side of the tail slat; and
   wherein the end cap is configured to contact part of the second locking member.

8. The tonneau cover system according to claim 1, wherein the tonneau cover system comprises one or more rollers that engage an end of the tail slat, and an end cap having one or more roller slots, wherein the one or more rollers comprises one or more axles that extend through the one or more roller slots so that the end cap is between the one or more rollers and an edge of the tail slat.

9. The tonneau cover system according to claim 6, wherein an edge of the tail slat comprises a seal and the end cap is configured to cover at least part of the seal.

10. The tonneau cover system according to claim 3, wherein the first locking device or the second locking device comprises a torsion spring that is configured to store energy when the lock assembly is moved from an closed position to an open position.

11. The tonneau cover system according to claim 9, wherein the tonneau cover system comprises a compartment into which the cover is configured to be moved into and out of.

12. The tonneau cover system according to claim 7, wherein the end cap comprises one or more contact surfaces that are configured to contact the side rail to align the cover in a cross car direction.

13. The tonneau cover system according to claim 3, wherein the second locking device is secured to a bottom portion of the tail slat in a receiving slot.

14. The tonneau cover system according to claim 13, wherein the first locking device is secured to the bottom portion of the tail slat.

* * * * *